(12) United States Patent
Cherry

(10) Patent No.: US 7,401,610 B1
(45) Date of Patent: Jul. 22, 2008

(54) STOVE SWITCH SAFETY COVER

(76) Inventor: Monay Cherry, 1477 Janrick Ave., Sacramento, CA (US) 95832

(*) Notice: Subject to any disclaimer, the term of this patent is extended or adjusted under 35 U.S.C. 154(b) by 665 days.

(21) Appl. No.: 10/671,957

(22) Filed: Sep. 26, 2003

(51) Int. Cl.
*F24C 3/12* (2006.01)

(52) U.S. Cl. .................. 126/42; 126/211; 126/214 D

(58) Field of Classification Search .............. 126/42, 126/211, 213, 214 R, 214 D, 212, 39 N
See application file for complete search history.

(56) References Cited

U.S. PATENT DOCUMENTS

| | | | | |
|---|---|---|---|---|
| 928,770 | A * | 7/1909 | Knudsen | 126/42 |
| 2,764,968 | A * | 10/1956 | Shuster | 126/42 |
| 3,527,200 | A * | 9/1970 | Voeke et al. | 126/42 |
| 3,789,823 | A * | 2/1974 | Doskocil | 126/42 |
| 4,922,888 | A * | 5/1990 | Bryan et al. | 126/42 |
| 6,371,105 | B1 * | 4/2002 | Merritt | 126/42 |

* cited by examiner

*Primary Examiner*—Jiping Lu

(57) ABSTRACT

The stove switch safety cover is a child safety device that is designed to deny children access to the control knobs of a stove. This shield would extend the entire width of the stove controls, covering and protecting the knobs from the child. The device would primarily consist of a back plate that would be mounted to the stove's control panel behind the knobs, a magnetic strip placed on the front of each control knob, a cover attached to the right edge of the back plate with a hinge, magnetic switches located on the interior of the cover, and a locking mechanism on the left edge of the cover. The magnetic switches would be spaced along the inside of the cover so they line up with the control knobs of the stove. When the cover is locked, the contacts in the magnetic switches would close when the magnetic strips are in polar and vertical alignment with the magnetic switches, allowing the illumination of an LED associated with each control knob when the control knob is placed in the OFF position. The LEDs are placed such that they can be viewed from the front of the locked cover. The LEDs will only be lit when the control knobs are in the locked position and the cover is in the closed position.

12 Claims, 4 Drawing Sheets

STOVE SWITCH SAFETY COVER

BACKGROUND OF THE INVENTION

1. Field of the Invention

The present invention relates to a stove switch safety cover for use in connection with the controls for stove top burners. The stove switch safety cover has particular utility in connection with locking the control knobs of the stove in an OFF position, thereby denying access to the knobs to any individual not possessing the key to unlock the cover.

2. Description of the Prior Art

Many accidents that occur in the home involve the stove. Typically, a curious child will play with the stove's control knobs, resulting in an unattended burner, a fire, or injury. If the device is a gas stove, this can lead to severe health and fire risks. The occupants of the house could be overcome by the gas fumes, eventually dying if not discovered in time. Furthermore, the gas in the air is combustible and can be easily ignited by a spark if not detected. A further threat of fire is also present in both gas and electric stoves. Should a pan of food be left on the burner or an item left within close proximity to the burner, the unattended burner could eventually set the food or the item on fire. An additional danger with the stove is that of the child pulling the pan of food from the hot burner and spilling it on himself, resulting in severe burns, especially if water or hot fat is present in the pan. Therefore, a device which could lock the stove into an inoperable position and deny access to individuals not possessing the key to the lock would prevent the aforementioned misfortunes from happening.

The use of stove locking devices is known in the prior art. For example, U.S. Pat. No. 2,834,335 to Antonio Rondello discloses a gas stove safety device that consists of a rod that passes through a hole in each control knob and has a keyed lock on one end to prevent the knobs from being turned. However, the Rondello '335 patent is limited in use to stoves having knobs with holes in the lower section through which the rod may be passed. Control knobs for today's stoves rarely contain such holes and lack a shape that would lend itself to such a modification. Furthermore, the rod of the Rondello '335 device could entice a child to swing on it, which could result in the bending or breaking of the rod and possible damage to the control knobs.

U.S. Pat. No. 4,836,181 to Halvor Saga discloses a safety device for stoves that comprises a front plate, for covering the control knobs, which may be raised in tracks and side plates which together comprise a partially peripheral obstacle for mounting the object on the front edge of a rectangular stove top. However, the Saga '181 patent makes no provision for a locking mechanism for the safety device, leaving the control knobs susceptible to an especially clever child or to a mentally challenged adult. Furthermore, the Saga '181 device could not be used with a stove top having the control panels on a flat horizontal surface as there would be no method for attaching the side plates of the device.

Similarly, U.S. Pat. No. 2,413,237 to William R. Jones discloses a safety control valve which is connected in the gas supply in advance of the manifold through which gas is supplied to the stove and oven burners and which can be locked in a closed position, effectively cutting off the gas supply to the burners. However, the Jones '237 device is not effective for electric stoves and ovens; therefore it would not be applicable to a large number of stoves in use today. Moreover, the Jones '237 device is not visible to an individual visually inspecting the stove and might lead to confusion as to why the stove is not operating properly.

U.S. Pat. No. 4,134,386 to Fred Miguel discloses a stove switch cover comprising a lock adapted to be mounted on the control panel of a stove and having a rotatable latch extending behind the control panel, with an elongated housing receiving the control knobs in its open rear portion. However, use of the Miguel '386 device requires the stove owner to modify the control panel of the stove to receive hardware for supporting both the hinge and the locking mechanism. Individuals renting homes or apartments might not be able to make such modifications to the stove. Additionally, the Miguel '386 knob cover opens upward and would probably fall closed again and need to be reopened each time the user wanted to readjust the heat on one of the burners. Should the Miguel '386 device remain upright after being opened, it would interfere with an individual's ability to cook on the stove top.

Likewise, U.S. Pat. No. Des. 346,529 to Maglena Honaker discloses the ornamental design for a stove panel guard that would be used as a splashguard for stoves having a vertical control panel located at the rear of the top surface. However, the Honaker '529 patent makes no provision for locking the splashguard to prohibit access to the control knobs. Furthermore, the Honaker '529 device would not be suitable for stoves with control knobs on the top front surface since it is not attached in any manner to the control panel.

Lastly, U.S. Pat. No. 5,771,878 to Luke E. Lewis and Christopher E.

Lewis discloses a safety knob for a stove or range that has a releasable lock assembly which prevents a switch or valve of the range from being turned to the ON position. The lock assembly has a pin movable between a lock position and a release position with a linear to rotational movement mechanism mounted in a housing joined to the body of the knob. However, the Lewis, et al. '178 patent requires the use of specific knobs that might not be compatible with all stoves. Additionally, the Lewis, et al. '178 device can easily be unlocked with the push of a button. A curious or observant child watching his caregiver could easily ascertain how the knobs were unlocked and perform the task for himself.

While the above-described devices fulfill their respective, particular objectives and requirements, the aforementioned patents do not describe a stove switch safety cover that allows the owner to deny access to the stove's control knob by locking them in an OFF position. Saga '181 and Honaker '529 patents make no provision for a locking mechanism for the safety device, leaving the control knobs susceptible to an especially clever child or to a mentally challenged adult. In addition, the Lewis, et al. '178 device can easily be unlocked with the push of a button. A curious or observant child watching his caregiver could easily ascertain how the knobs were unlocked and perform the task for himself. The Rondello '335, Saga '181, Jones '237, Honaker '529, and Lewis, et al. '178 devices are limited in use because they are not compatible with all types of stoves. The Rondello '335 requires the control knobs to have holes through which the locking rod is inserted. Control knobs for today's stoves rarely contain such holes and lack a shape that would lend itself to such a modification. Furthermore, the rod of the Rondello '335 device could entice a child to swing on it, which could result in the bending or breaking of the rod and possible damage to the control knobs. The Saga '181 device could not be used with a stove top having the control panels on a flat horizontal surface as there would be no method for attaching the side plates of the device, while the Jones '237 device is not compatible for use with electric stoves. Moreover, the Jones '237 device is not visible to an individual visually inspecting the stove and might lead to confusion as to why the stove is not operating properly. Use of the Miguel '386 device requires the stove owner to modify the control panel of the stove to receive hardware for supporting both the hinge and the locking mechanism. Individuals renting homes or apartments might not be able to make such modifications to the stove. The Honaker '529 device would not be suitable for stoves with control knobs on the top front surface since it is not attached in any manner to the control panel, and the Lewis, et al. '178 device requires the use of specific knobs that might not be compatible with all stoves. Finally, the knob cover opens upward on the Miguel '386 device and would probably fall closed again, requiring the user to reopen the cover each time the heat on one of the burners needs adjusting. Should the Miguel '386 device remain upright after being opened, it would interfere with an individual's ability to cook on the stove top Therefore, a need exists for a new and improved stove switch safety cover that can be used for prohibiting access to the control knobs of any type of stove. In this regard, the present invention substantially fulfills this need. In this respect, the stove switch safety cover according to the present invention substantially departs from the conventional concepts and designs of the prior art, and in doing so provides an apparatus primarily developed for the purpose of providing a locking safety cover for the control knobs for a stove that denies access to any individual not possessing the appropriate key.

SUMMARY OF THE INVENTION

In view of the foregoing disadvantages inherent in the known types of stove locking devices now present in the prior art, the present invention provides an improved stove switch safety cover, and overcomes the above-mentioned disadvantages and drawbacks of the prior art. As such, the general purpose of the present invention, which will be described subsequently in greater detail, is to provide a new and improved stove switch safety cover and method which has all the advantages of the prior art mentioned heretofore and many novel features that result in a stove switch safety cover which is not anticipated, rendered obvious, suggested, or even implied by the prior art, either alone or in any combination thereof.

To attain this, the present invention essentially comprises a back plate that would be mounted to the stove's control panel behind the knobs, a magnetic strip placed on the front of each control knob, a cover attached to the right edge of the back plate with a hinge, magnetic switches located on the interior of the cover, and a locking mechanism on the left edge of the cover.

A second embodiment of the invention consists of an upper and lower locking bar joined along a hinged locking mechanism. Each of the locking bars has teeth that fit on either side of each control knob of a stove, essentially prohibiting movement of the knob when the device is locked. When the device is unlocked, the teeth move away from each other and free the knobs for normal usage.

There has thus been outlined, rather broadly, the more important features of the invention in order that the detailed description thereof that follows may be better understood and in order that the present contribution to the art may be better appreciated.

The invention may also include a series of LEDs attached to the front of the cover that would be used to indicate that the control knobs are in the OFF position when the cover is locked over them.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved stove switch safety cover that has all of the advantages of the prior art stove locking devices and none of the disadvantages.

It is another object of the present invention to provide a new and improved stove switch safety cover that may be easily and efficiently manufactured and marketed.

An even further object of the present invention is to provide a new and improved stove switch safety cover that has a low cost of manufacture with regard to both materials and labor, and which accordingly is then susceptible of low prices of sale to the consuming public, thereby making such a stove switch safety cover economically available to the buying public.

Still another object of the present invention is to provide a new stove switch safety cover that provides in the apparatuses and methods of the prior art some of the advantages thereof, while simultaneously overcoming some of the disadvantages normally associated therewith.

Even still another object of the present invention is to provide a stove switch safety cover for covering the entire length of a stove's control. This allows a responsible individual to deny access to the stove's controls to any other individuals, providing a safer and more peaceful atmosphere for a homeowner or caregiver responsible for children, mentally ill patients, or confused individuals.

Yet another object of the present invention is to provide a stove switch safety cover that can be locked by a responsible individual. This allows the adult or caregiver to safely leave the stove unattended, preventing fires and injury due to individuals playing with the control knobs on a stove.

Still yet another object of the present invention is to provide a stove switch safety cover that allows the user to visually determine whether all control knobs are in the OFF position once the cover is in place. This allows the responsible individual to safely apply the cover without accidentally leaving one of the control knobs in an activated position.

Lastly, it is an object of the present invention to provide a new and improved stove switch safety cover that is easily mounted on a conventional stove. This allows the user to mount the device to multiple types of stoves without modifying the existing stove, increasing the likelihood that such a device will be employed.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
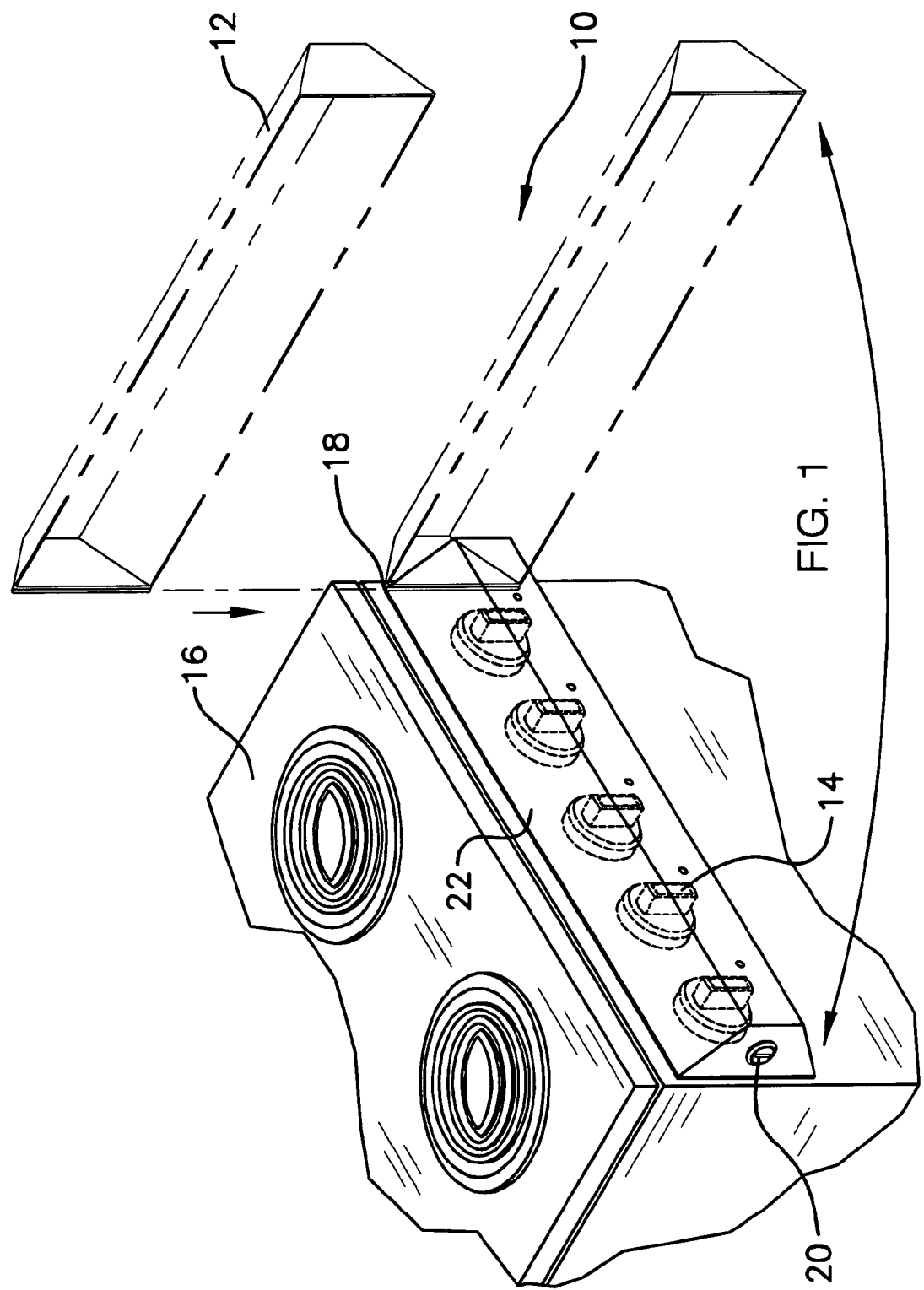
FIG. 1 is a left side perspective view of the preferred embodiment of the stove switch safety cover constructed in accordance with the principles of the present invention and mounted on a stove control panel.

Referring now to the drawings, and particularly to FIGS. 1-7, a preferred embodiment of the stove switch safety cover of the present invention is shown and generally designated by the reference numeral 10.

In FIG. 1, a new and improved stove switch safety cover 10 of the present invention for prohibiting access to the control knobs of any type of stove is illustrated and will be described. More particularly, the stove switch safety cover 10 has a cover 12 that fits across the control knobs 14 of a stove 16. The cover 12 rotates along a hinge 18 for easy access to the control knobs 14 and features a keyed lock 20 to prohibit access to the control knobs when the cover 12 is in place.

Figure 2:
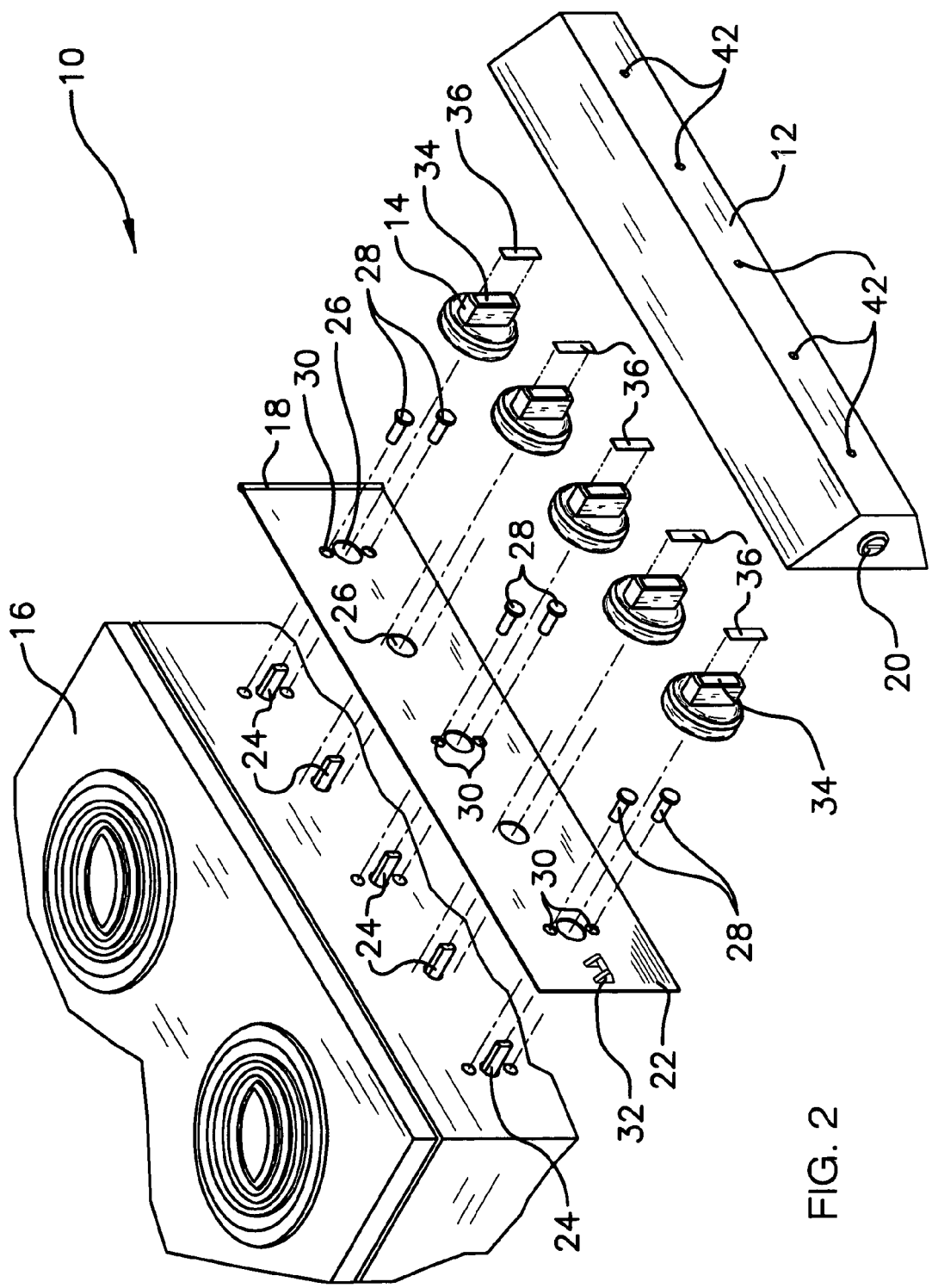
FIG. 2 is an exploded left side perspective view of the stove switch safety cover of the present invention.

FIG. 2 shows an exploded left perspective view of the stove switch safety cover 10. A back plate 22 would be placed over the mounting posts 24 of the control knobs 14. A post hole 26 and two screw holes 28 would be fashioned in the back plate 22 for each control knob 14. The back plate 22 would be installed behind the control knobs 14 and would be connected to the cover 12 along the hinge 18 on the right edge. Mounting the control knobs 14 on the mounting posts 24 and inserting a screw 30 into each screw hole 28 would secure the back plate 22. A key latch 32 is located on the left end of the cover 12. The key latch 32 interacts with the keyed lock 20, locking the cover 12 to the back plate 22. The front 34 of each knob 14 contains a magnetic strip 36 which works with a magnetic switch 38 (see FIG. 5) inside the cover 12 to give a clear indication that the knob 14 is in the OFF position by lighting an LED 40 (see FIG. 5). Each LED 40 can be viewed through the associated LED port 42 in the cover 12. A transparent lens 44 is placed over the port 42 to prevent spills from entering the cover 12.

Figure 3:
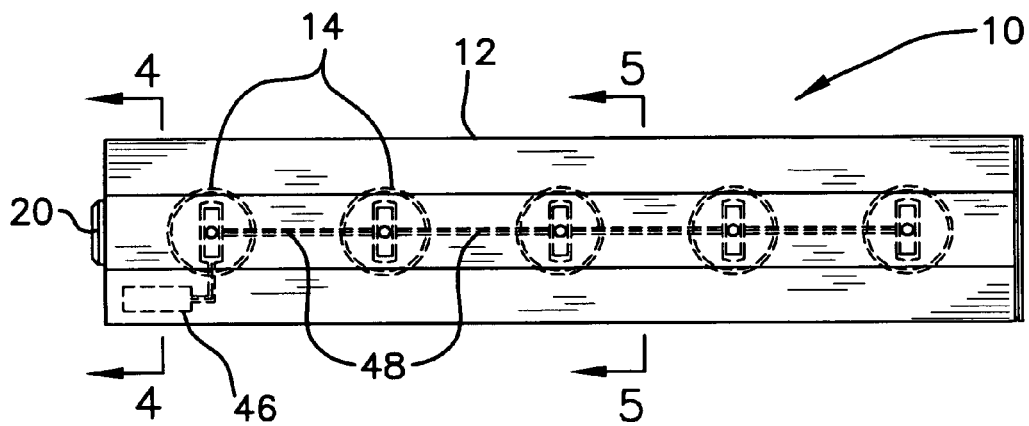
FIG. 3 is a front view of the stove switch safety cover of the present invention.

FIG. 3 shows a front view of the stove switch safety cover 10. This view shows a possible placement for the battery 46 which powers the LEDs 40. Each LED 40 is connected serially by wiring 48 to a magnetic switch 38, which in turn is connected by wiring 48 to the battery 46 residing on the internal surface 50 of the bottom panel 52 of the cover 12 near the left side 54 (see FIG. 5).

Figures 4, 5:
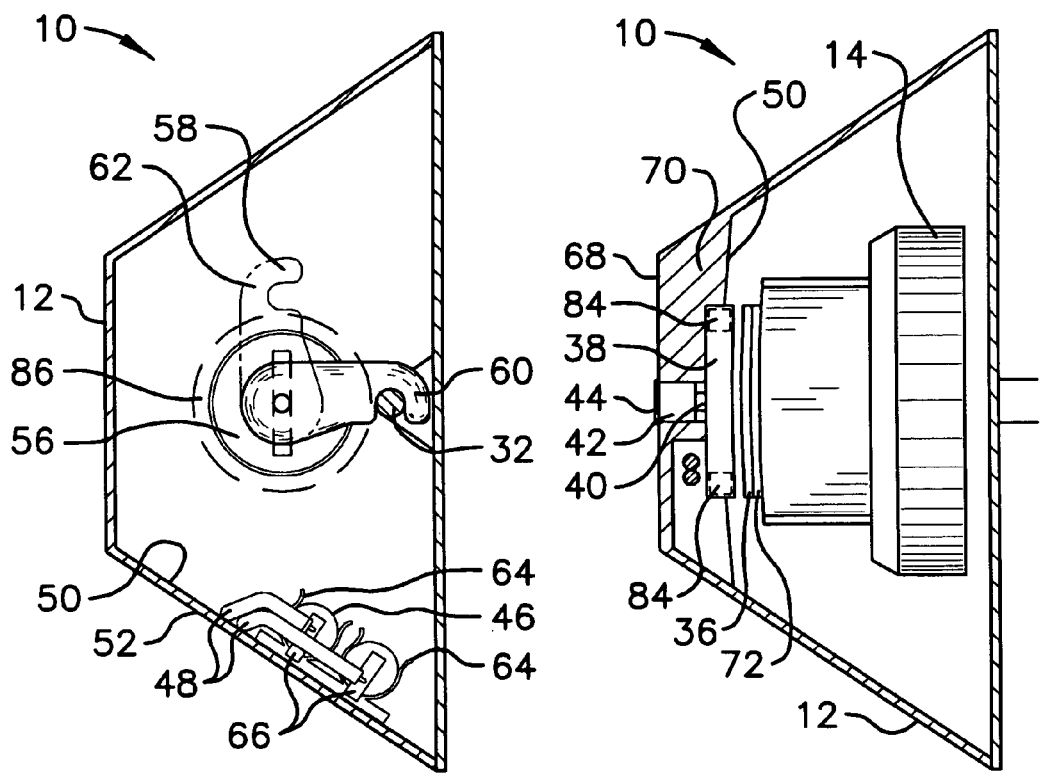
FIG. 4 is a right cross sectional view of the locking mechanism of the stove switch safety cover of the present invention.
FIG. 5 is a right cross sectional view of a control knob of the stove switch safety cover of the present invention.

FIG. 4 shows a right cross sectional view of the locking mechanism of the stove switch safety cover 10. Inserting a key into the circular lock face 56 engages the lock shaft 86 upon which the hook 58 portion of the keyed lock 20 is mounted. By turning the key, the user rotates the shaft 86 thereby rotating the hook 58 forward to intercept the key latch 32, effectively placing the hook 58 in the locked position 60. The key may be turned in the reverse direction to release the hook, leaving the hook 58 in the unlocked position 62. This view also shows the location of the batteries 46 along the internal surface 50 of the bottom panel 52 of the cover 12. Each battery 46 is secured by placing it in a battery clip 64. A connector strip 66 connects the end of each battery 46 to the electrical wiring 48 which provides power to the LEDs 40.

FIG. 5 shows a right cross sectional view of one of the control knobs 14 of the stove switch safety cover 10. The internal surface 50 of the front panel 68 of the cover 12 contains one magnetic switch 38 vertically aligned in front of each control knob 14. When the magnetic strip 36 on the control knob 14 is in vertical and polar alignment with its associated magnetic switch 38, the magnetic contact points within the switch 38 close, providing power to the associated LED 40 and causing it to illuminate. Each LED 40 is located inside one of the LED ports 42 in the front panel 68 of the cover 12 and has a transparent lens 44 placed over it for protection. The upper portion 70 of the internal surface 50 of the front panel 68 is formed to support each magnetic switch 38, its associated LED 40, and its associated LED port 42. The magnetic strips 36 are affixed to the control knobs 14 with an adhesive strip 72.

Figure 6:
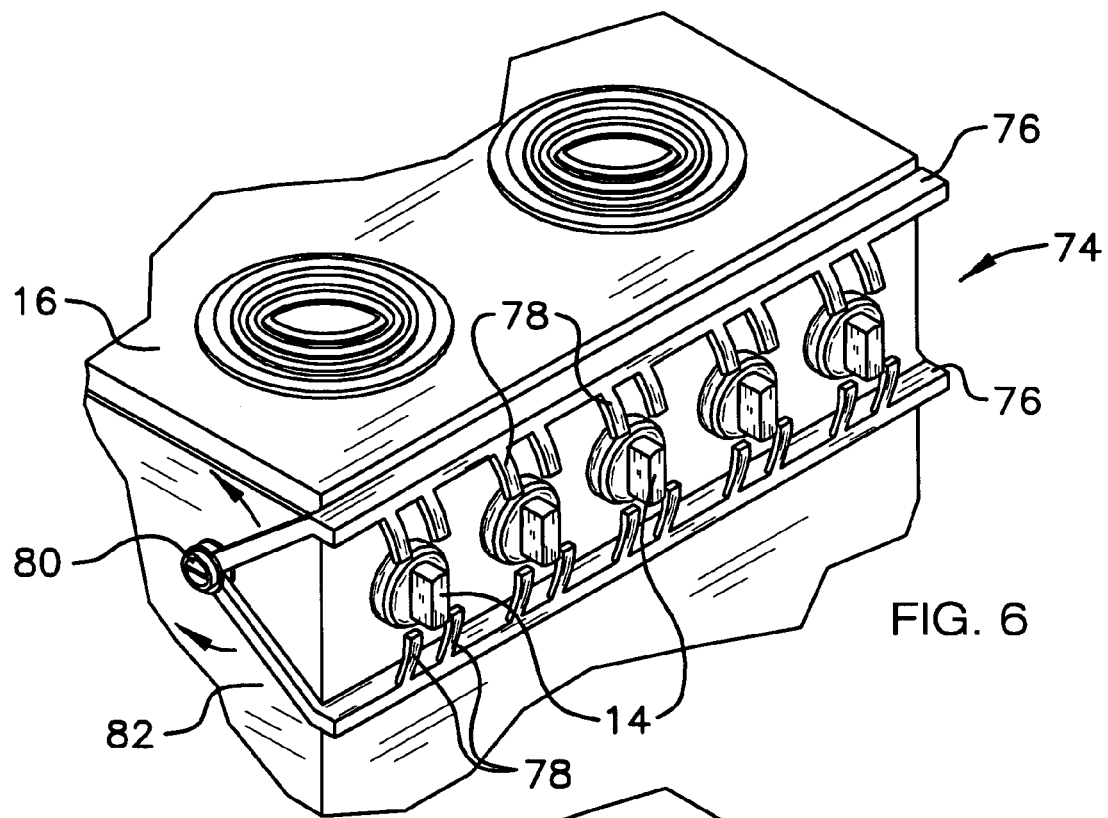
FIG. 6 is a left side perspective view of the second embodiment of the stove switch safety cover of the present invention in the open position.
Figure 7:
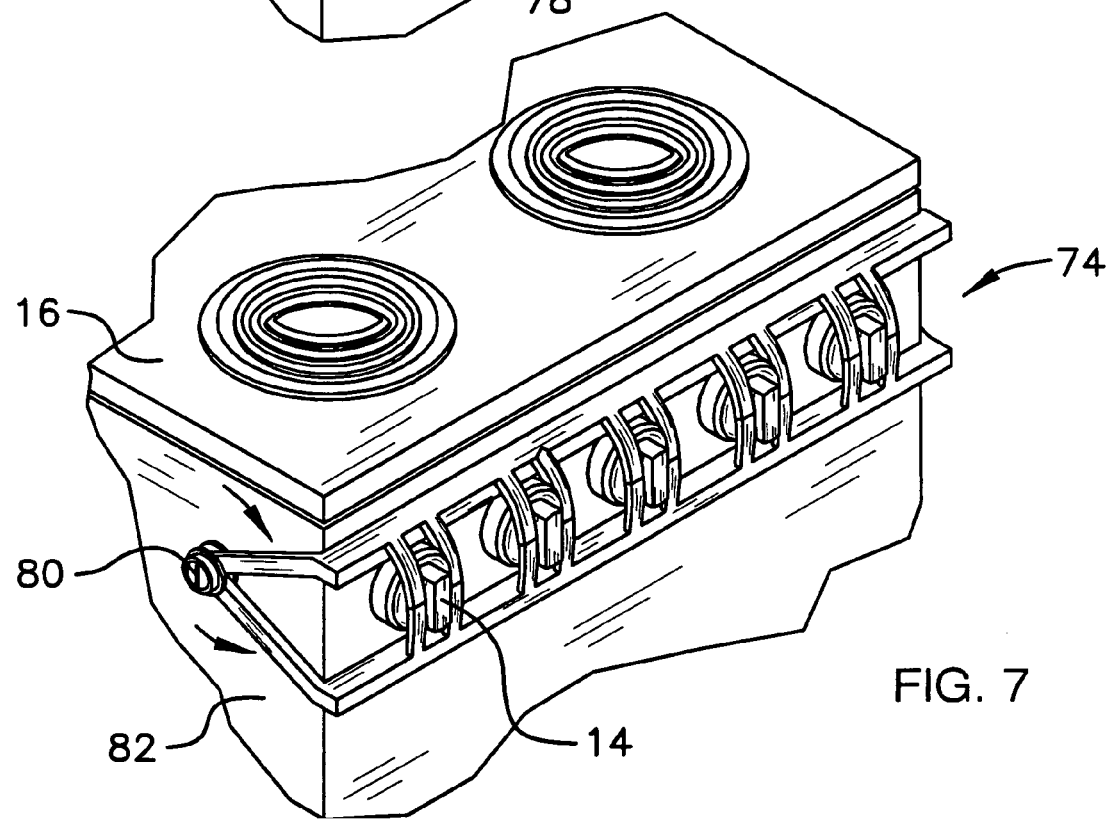
FIG. 7 is a left side perspective view of the second embodiment of the stove switch safety cover of the present invention in the closed position.

FIGS. 6 and 7 show a second embodiment of the stove switch safety cover, referred to as 74. This embodiment of the stove switch cover 74, consists of opposing hinged extension bars 76 located above and below the control knobs 14 of a stove 16. The hinged bars 76 have a series of locking teeth 78 extending from them that would serve as locks for the control knobs 14 when the hinged bars 76 are brought together. The bars 76 would align on each side of a knob 14 when it is turned to the OFF position (with the knob projection in a vertical position). A keyed lock 80 would be mounted on the side 82 of the stove 16. When the key is inserted into the lock 78 and rotated, the hinged bars 76 are brought together and placed in the locked position as is shown in FIG. 6. When the key is rotated in the opposite direction, the hinged bars 76 are pulled apart and placed in the unlocked position as is shown in FIG. 7. The locking teeth 78 allow an unhindered view of the control knobs 14, allowing the user to visually inspect the placement of the knobs 14. The stove switch safety cover 74 can only be locked if all control knobs 14 are placed in the OFF position.

In use, it can now be understood that the owner would install either of the two embodiments of the stove switch safety cover, 10 or 74, on his stove 12. In the first embodiment of the stove switch safety cover 10, this would be accomplished by removing the control knobs 14 and placing the back plate 22 over the mounting posts 24 by inserting each post 24 in the associated post hole 26 of the back plate 22. The user would then secure the back plate 22 to the stove 12 by mounting screws 30 through each screw hole 28 in the back plate 22. The user would then replace the control knobs 14 and apply the magnetic strips 36 to the front of each knob 14. The user would then lock the cover 12 to prevent unauthorized access to the control knobs 14. A visual inspection of the front panel 68 of the cover 12 will show all LED's 40 illuminated if all control knobs 14 are in the OFF position. If all LED's 40 are not illuminated, the user would unlock the cover 12 and place the control knobs 14 in the OFF position. The cover 12 could be unlocked and rotated to the side when the user needed to utilize the control knobs 14 for cooking on the stove 16.

To install the second embodiment of the stove switch safety cover 74, the owner would mount the keyed lock 80 on the side 82 of the stove 16. To lock the device, the owner would insert the key into the lock 80 and rotate it, bringing the hinged bars 76 together. The locking teeth 78 allow an unhindered view of the control knobs 14, allowing the user to visually inspect the placement of the knobs 14. When the key is rotated in the opposite direction, the hinged bars 76 are pulled apart, unlocking the device.

While a preferred embodiment of the stove switch safety cover has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, or a variety of wood may be used for the cover and hinged bars of the stove switch safety cover. And although prohibiting access to the control knobs of any type of stove has been described, it should be appreciated that the stove switch safety cover herein described is also suitable for prohibiting access to many appliances that have control knobs. The stove switch safety cover could also include decorative elements, including a time display.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stove switch safety cover comprising:
    a flat back plate having a front surface formed with a plurality of transverse post mounting holes in a horizontally linear arrangement and a plurality of screw mounting holes, a rear surface, a top edge, a bottom edge parallel to said top edge, a right edge perpendicular to said top edge and joining said top edge to said bottom edge, and a left edge parallel to said right edge;
    a key latch connected to said front surface of said back plate near said left edge;
    a hinge connected along the entirety of said right edge of said back plate;
    a cover with an interior surface and an exterior surface and having a flat front panel formed with a plurality of transverse apertures in a horizontally linear arrangement and with a top edge, a bottom edge parallel to said top edge, a right edge perpendicular to said top edge and joining said top edge to said bottom edge, and a left edge parallel to said right edge; an open rear; a top panel angling downward and outward from said top edge of said front panel; a bottom panel angling downward and outward from said bottom edge of said front panel; a right panel having a top edge and a bottom edge and connected on said top edge to said right edge of said top panel and joining said front panel to said top panel and said bottom panel; and a left panel having a top edge and a bottom edge and parallel to said right panel and connected on said top edge to said left edge of said top panel and joining said front panel to said top panel and to said bottom panel and connected on said bottom edge of said right panel to said hinge wherein said cover can be rotated along said hinge in a direction towards or away from said back plate;
    a locking mechanism connected to said left panel of said cover;
    a plurality of magnetic switches connected to said interior surface of said cover along said front panel;
    a plurality of magnetic strips magnetically connected to said magnetic switches wherein said magnetic strips are placed in close proximity to said magnetic switches when said bottom edge of said left panel contacts said back plate when said cover is rotated toward said back plate along said hinge;
    a power source connected to said internal surface of said cover;
    a first plurality of electrical wires serially connected said power source to said magnetic switches;
    a plurality of light emitting diodes (LEDs) connected to said internal surface of said cover on said front panel wherein said LEDs are aligned with said transverse apertures in said front panel of said cover; and
    a second plurality of electrical wires connecting each said magnetic switch to one said LED.

2. The stove switch safety cover of claim 1 further comprising
    a plurality of transparent discs connected to said front-panel of said cover wherein one said disc is inserted into each said transverse aperture in said front panel of said cover forming a protective lens for each said aligned LED.

3. The stove switch safety cover of claim 1 wherein said power source is a battery pack.

4. The stove switch safety cover of claim 1 wherein said transverse post mounting holes formed in said back plate are of a sufficient size and are arranged to fit around the posts of the knobs on a control panel for a conventional stove when said knobs are removed from said posts.

5. The stove switch safety cover of claim 4 wherein one said screw mounting hole is located above said post mounting hole and one said screw mounting hole is located below said post mounting hole for at least half of said post mounting holes.

6. The stove switch safety cover of claim 1 wherein said key latch further comprises:
    a first triangular support having a base and a top point formed with a small recess;

a short cylindrical rod having a first end and a second end and connected on said first end to said recess in said top point of said triangular support; and a second triangular support having a base and a top point formed with a small recess and connected at said small recess to said second end of said rod wherein said second triangular support is parallel to said first triangular support.

7. The stove switch safety cover of claim 6 wherein said locking mechanism further comprises:

a cylindrical key entry shaft formed with a keyed slot into which a matching key can be inserted;

a hook perpendicularly connected to said shaft wherein said hook is rotated downward when said key is turned in one direction and said hook is rotated upward when said key is turned in the opposite said direction.

8. The stove switch safety cover of claim 7 wherein said locking mechanism is aligned with said key latch wherein said hook of said locking mechanism will engage said rod of said key latch when said key is turned in said direction resulting in said hook rotating downward and said hook of said locking mechanism will release said rod of said key latch when said key is turned in the opposite said direction resulting in said hook rotating upward.

9. The stove switch safety cover of claim 1 wherein each said magnetic strip is affixed on the front of a different control knob of a stove and is in a matching polar vertical position as said magnetic switch when said control knob on which said magnetic strip has been placed is placed in the OFF position.

10. The stove switch safety cover of claim 9 wherein each said magnetic switch has contacts that are closed when associated said magnetic strip is in vertical and polar alignment with said magnetic switch and are open when associated said magnetic strip is in any other position.

11. The stove switch safety cover of claim 10 wherein each said LED is illuminated when associated said magnetic switch is in vertical and polar alignment with associated said magnetic strip.

12. The stove switch safety cover of claim 1 wherein said back plate and said cover are comprised of a material from the list of rustproof metal and heavy duty plastic.

* * * * *